US007076492B2

(12) United States Patent
Campbell et al.

(10) Patent No.: US 7,076,492 B2
(45) Date of Patent: Jul. 11, 2006

(54) GENERAL BUSINESS REPORT GENERATION

(75) Inventors: Michelle D. Campbell, Vestal, NY (US); James W. Nugent, Vestal, NY (US); Debra A. Parmeter, Castle Creek, NY (US); Scotty J. Reynolds, Dallas, TX (US); Jeffrey G. Willets, Apalachin, NY (US)

(73) Assignee: International Business Machines Corporation, Armonk, NY (US)

( * ) Notice: Subject to any disclaimer, the term of this patent is extended or adjusted under 35 U.S.C. 154(b) by 638 days.

(21) Appl. No.: 09/893,990

(22) Filed: Jun. 29, 2001

(65) Prior Publication Data

US 2003/0004919 A1 Jan. 2, 2003

(51) Int. Cl.
*G06F 17/30* (2006.01)
(52) U.S. Cl. .......................................... 707/101; 707/2
(58) Field of Classification Search ................ 707/101, 707/100, 102, 104.1, 10
See application file for complete search history.

(56) References Cited

U.S. PATENT DOCUMENTS

| 5,361,199 | A | | 11/1994 | Shoquist et al. | |
|---|---|---|---|---|---|
| 5,475,833 | A | | 12/1995 | Dauerer et al. | |
| 5,530,848 | A | * | 6/1996 | Gilbert et al. | .............. 719/313 |
| 5,787,283 | A | | 7/1998 | Chin et al. | |
| 5,974,395 | A | | 10/1999 | Bellini et al. | |
| 6,098,047 | A | | 8/2000 | Oku et al. | |
| 6,119,149 | A | | 9/2000 | Notani | |
| 6,128,602 | A | | 10/2000 | Northington et al. | |
| 6,151,582 | A | | 11/2000 | Huang et al. | |
| 6,463,585 | B1 | * | 10/2002 | Hendricks et al. | ............ 725/35 |
| 6,681,229 | B1 | * | 1/2004 | Cason et al. | ................. 707/101 |
| 2001/0002470 | A1 | * | 5/2001 | Inohara et al. | ................. 707/1 |
| 2002/0107864 | A1 | * | 8/2002 | Battas et al. | ................. 707/101 |
| 2002/0178172 | A1 | * | 11/2002 | Moore et al. | ............... 707/102 |
| 2003/0033317 | A1 | * | 2/2003 | Ziglin | ........................ 707/102 |

* cited by examiner

*Primary Examiner*—Safet Metjahic
*Assistant Examiner*—Brian Goddard
(74) *Attorney, Agent, or Firm*—Schmeiser, Olsen & Watts; John R. Pivnichny

(57) ABSTRACT

A system and method for generating a report by a reporting tool of the Systems Applications and Products (SAP) online financial software. An SAP-readable Aspect file is generated and transmitted to the SAP system where the Aspect file may be queried for generating the report. The Aspect file may be generated by a non-SAP bridge program that utilizes a dataset which may be in a SAP or a non-SAP format. Processing the dataset to generate the Aspect file may include data filtration based on selection rules, and may additionally include rolling up the data of the dataset. Two or more of such datasets may be collectively used to form corresponding Aspect files for generating a report based on a query that relates to the corresponding Aspect files. The Aspect file may include procurement data such as purchase order data and invoice data.

49 Claims, 8 Drawing Sheets

| Record 1 | * |
| --- | --- |
| Record 2 | * |
| Record 3 | |
| Record 4 | |
| Record 5 | * |
| Record 6 | * |
| Record 7 | * |
| Record 8 | |
| Record 9 | * |
| Record 10 | |
| Record 11 | |
| Record 12 | |
| Record 13 | * |
| Record 14 | * |
| Record 15 | |

*FIG. 2*

| Purchase Order No. | Vendor | Division | Color | Buyer |
|---|---|---|---|---|
| 1 | A | 300 | white | 64 |
| 2 | B | 200 | blue | 26 |
| 3 | B | 100 | blue | 20 |
| 4 | C | 100 | white | 21 |
| 5 | C | 300 | blue | 33 |
| 6 | B | 300 | blue | 10 |
| 7 | B | 200 | blue | 45 |
| 8 | A | 100 | white | 38 |
| 9 | C | 300 | blue | 98 |
| 10 | B | 200 | white | 56 |
| 11 | A | 300 | white | 23 |
| 12 | C | 100 | blue | 51 |
| 13 | A | 200 | blue | 19 |
| 14 | A | 200 | white | 46 |
| 15 | B | 300 | blue | 88 |
| 16 | C | 100 | white | 27 |
| 17 | C | 300 | blue | 15 |
| 18 | B | 300 | blue | 93 |
| 19 | B | 200 | white | 60 |
| 20 | B | 100 | white | 72 |
| 21 | A | 200 | white | 57 |
| 22 | C | 100 | blue | 35 |

*FIG. 3*

| Purchase Order No. | Vendor | Division | Color | Buyer |
|---|---|---|---|---|
| 12 | C | 100 | blue | 51 |
| 3 | B | 100 | blue | 20 |
| 22 | C | 100 | blue | 35 |
| 4 | C | 100 | white | 21 |
| 16 | C | 100 | white | 27 |
| 20 | B | 100 | white | 72 |
| 8 | A | 100 | white | 38 |
| 13 | A | 200 | blue | 19 |
| 2 | B | 200 | blue | 26 |
| 7 | B | 200 | blue | 45 |
| 19 | B | 200 | white | 60 |
| 14 | A | 200 | white | 46 |
| 21 | A | 200 | white | 57 |
| 10 | B | 200 | white | 56 |
| 9 | C | 300 | blue | 98 |
| 18 | B | 300 | blue | 93 |
| 5 | C | 300 | blue | 33 |
| 6 | B | 300 | blue | 10 |
| 17 | C | 300 | blue | 15 |
| 15 | B | 300 | blue | 88 |
| 1 | A | 300 | white | 64 |
| 11 | A | 300 | white | 23 |

*FIG. 4*

| Vendor | Division | Color | Quantity |
|---|---|---|---|
| C | 100 | blue | 3 |
| C | 100 | white | 4 |
| A | 200 | blue | 3 |
| B | 200 | white | 4 |
| C | 300 | blue | 6 |
| A | 300 | white | 2 |

*FIG. 5*

| Field Name | Brief Description | Data Type | SAP Field Name | Source |
|---|---|---|---|---|
| MANDT | Client | CLNT 003 | MANDT | T000 |
| RECTY | Record type | CHAR 001 | CFRECTY | |
| VERSO | Version | NUMC 002 | CFVERSO | T242V |
| YEARB | Fiscal year | NUMC 004 | CFYEARB | |
| PERDE | Period | NUMC 003 | CFPERDE | |
| COMCOD | Company code | CHAR 004 | BUKRS | T001 |
| ZCOMM | Commodity | CHAR 009 | ZCOMM | ZEISC |
| ZMAJR | Major Requestor | CHAR 002 | ZMAJR | |
| DYSRF | Number of Days | CHAR 003 | RKCG_DYSR | T271H |
| KNTTP | Acct.assgt.cat | CHAR 001 | KNTTP | T163K |
| ASAP | asap indicato | CHAR 001 | RKCG_ASA | T2719 |
| ZORIG | Origin | CHAR 003 | ZORIG | |
| ZVEND | Vendor | CHAR 017 | ZVEND | ZEISV |
| ZVNAM | Vendor name | CHAR 032 | ZVNAM | |
| VALTY | Value type | CHAR 001 | CFVALTY | T242W |
| RECNR | Record number | NUMC 008 | CFRECNR | |
| AEDTM | Changed on | DATS 008 | CFAEDTM | |
| UNAME | User name | CHAR 012 | CFUNAME | |
| PINTR | Referenc | NUMC 008 | CFPINTR | |
| SUPSG | supplier segment | CHAR 004 | RKCG_SUPS | T2715 |
| ITMAC | quantity item accts | QUAN 008 | RKCG_ITMAC | |
| ITMAC_UNIT | Unit | UNIT 003 | RKCG_UNIT | T006 |
| ZTDYS | total days | QUAN 008 | RKCG_ZTDYS | |
| ZTDYS_UNI | Unit | UNIT 003 | RKCG_UNIT | T006 |

*FIG. 6*

Field   Detailed
Name    Description

MANDT   Client - IBM SAP Instance Number - field automatically populated through
        EIS; source system leaves blank RECTY   Record type - Assigned by EIS, source system leaves blank; all of our EIS
        applications insert '0' into this field indicating the record contains
        numerous data values (as opposed to '1' saying this is a text description record)

VERSO   Version - 01 or 02, records coming from source contain '01'

YEARB   Fiscal year - Year from the end date off the control card used to strip the data
        from the source PERDE   Period - Month from the end date on the control card COMCOD  Company code - Number assigned to identify different IBM locations
        (ie. '0147' represents US)

ZCOMM   Commodity - Also known as Material Group id; the commodity code from the source
        system (commodity codes are a standard set of codes representing the different
        materials being handled)

ZMAJR   Major Requestor - aka division code; uniquely identifies the individual IBM
        business unit (ie. 07 represents Global Services, 42 is Micro Electronics)

DYSRF   Number of Days - number of days the invoice has been blocked
        (in referral); carried as characteristic for EIS (in CHAR format)

KNTTP   Acct. assgt. cat. - aka resale flag; indicates whether the material is internal
        or resale ASAP    asap indicator - aka buyerless flag; indicates the purchase order (material)
        has not been handled by a buyer but has entered the system through an automated
        process ZORIG   Origin - Location of where the data has come from (ie. from BDW would be
        001, from SAP US would be 003)

ZVEND   Vendor - Vendor id, number uniquely identifying the vendor to IBM

ZVNAM   Vendor name - the vendor name associated with the vendor number

VALTY   Value type - assigned by EIS source systems pass in as a constant; values
        represented: 0=actual data, 1=planning data, 2=target data RECNR   Record number - EIS assigned; used internally by the EIS system AEDTM   Changed on - EIS populated; last date the record was touched UNAME   User name - EIS populated with the last user touching the record PINTR   Reference - EIS assigned and used internally to the EIS system SUPSG   Supplier segment - IBM standard code for purchasing organization ITMAC   quantity item accts - number of item accounts on this invoice ITMAC_UNIT   Unit - Unit of measure for the item account (ie. piece, carton)

ZTDYS   total days - key figure, used for queries and reporting, showing actual days in
        referral and carried as a fixed decimal field ZTDYS_UNIT   Unit - Populated by EIS for internal use

FIG. 7

GENERAL BUSINESS REPORT GENERATION

BACKGROUND OF THE INVENTION

1. Technical Field

The present invention relates to a system and associated method for generating a report by a reporting tool of the online financial software known as Systems Applications and Products (SAP).

2. Related Art

The online financial software known as Systems Applications and Products (SAP) includes the business data warehouse modules of Logistic Information System (LIS) and Open Information Warehouse (OIW), and an associated reporting module called Executive Information System (EIS) that receives and operates upon data from LIS and OIW. The SAP software is owned by the SAP company in Germany. Unfortunately, data processing using EIS in conjunction with the LIS and OIW modules for generating reports based on large volumes of data is inefficient and prohibitively time consuming. Accordingly, there is a need for a time-efficient method and system for generating reports within SAP.

SUMMARY OF THE INVENTION

The present invention provides a system for generating a report by a reporting tool of a SAP business information system using data included within an Aspect file, said system comprising a non-SAP bridge program adapted to generate the Aspect file through use of data derived from a dataset and to transmit the Aspect file to the SAP business information system.

The present invention provides a system for generating a report by a reporting tool of a SAP business information system using data included within an Aspect file having rollup records, said system comprising a non-SAP bridge program adapted to generate the Aspect file through use of data derived from a dataset and to transmit the Aspect file to the SAP business information system, said dataset having a keygroup, wherein to generate the Aspect file includes to roll up a portion of the dataset with respect to the keygroup, wherein each rollup record has a rollup field and a quantity field, wherein the rollup field stores a rollup keyvalue of the keygroup, and wherein the quantity field stores the number of dataset records that have the same rollup keyvalue.

The present invention provides a method for generating a report by a reporting tool of a SAP business information system using data included within an Aspect file, said method comprising executing a non-SAP bridge program, said executing including:

generating the Aspect file through use of data derived from a dataset; and transmitting the Aspect file to the SAP business information system.

The present invention provides a method for generating a report by a reporting tool of a SAP business information system using data included within an Aspect file having rollup records, said method comprising:

providing a dataset having a keygroup; and executing a non-SAP bridge program, including generating the Aspect file, said generating comprising rolling up a portion of the dataset with respect to the keygroup, wherein each rollup record has a rollup field and a quantity field, wherein the rollup field stores a rollup keyvalue of the keygroup, and wherein the quantity field stores the number of dataset records that have the same rollup keyvalue.

The present invention provides a time-efficient method and system for generating reports by the SAP Executive Information System (EIS). The present invention is relevant to any application that uses EIS, including applications involving procurement data, such as purchase order data and invoice data. Other applications may involve, inter alia, financial situations, human resources (e.g., personnel), financial markets (e.g., a stock market or commodity market), individual company stocks and/or bonds, etc.

BRIEF DESCRIPTION OF THE DRAWINGS

FIG. 2 illustrates select records of a dataset, in accordance with embodiments of the present invention.

FIG. 3 is a dataset table of raw data, in accordance with embodiments of the present invention.

FIG. 4 is the dataset table of FIG. 3 as sorted, in accordance with embodiments of the present invention.

FIG. 5 is the dataset table of FIG. 4 as rolled up, in accordance with embodiments of the present invention.

FIG. 6 depicts fields of an exemplary Aspect containing blocked invoices, in accordance with embodiments of the present invention.

FIG. 7 depicts a detailed description of the fields of FIG. 6

DETAILED DESCRIPTION OF THE INVENTION

Figure 1:
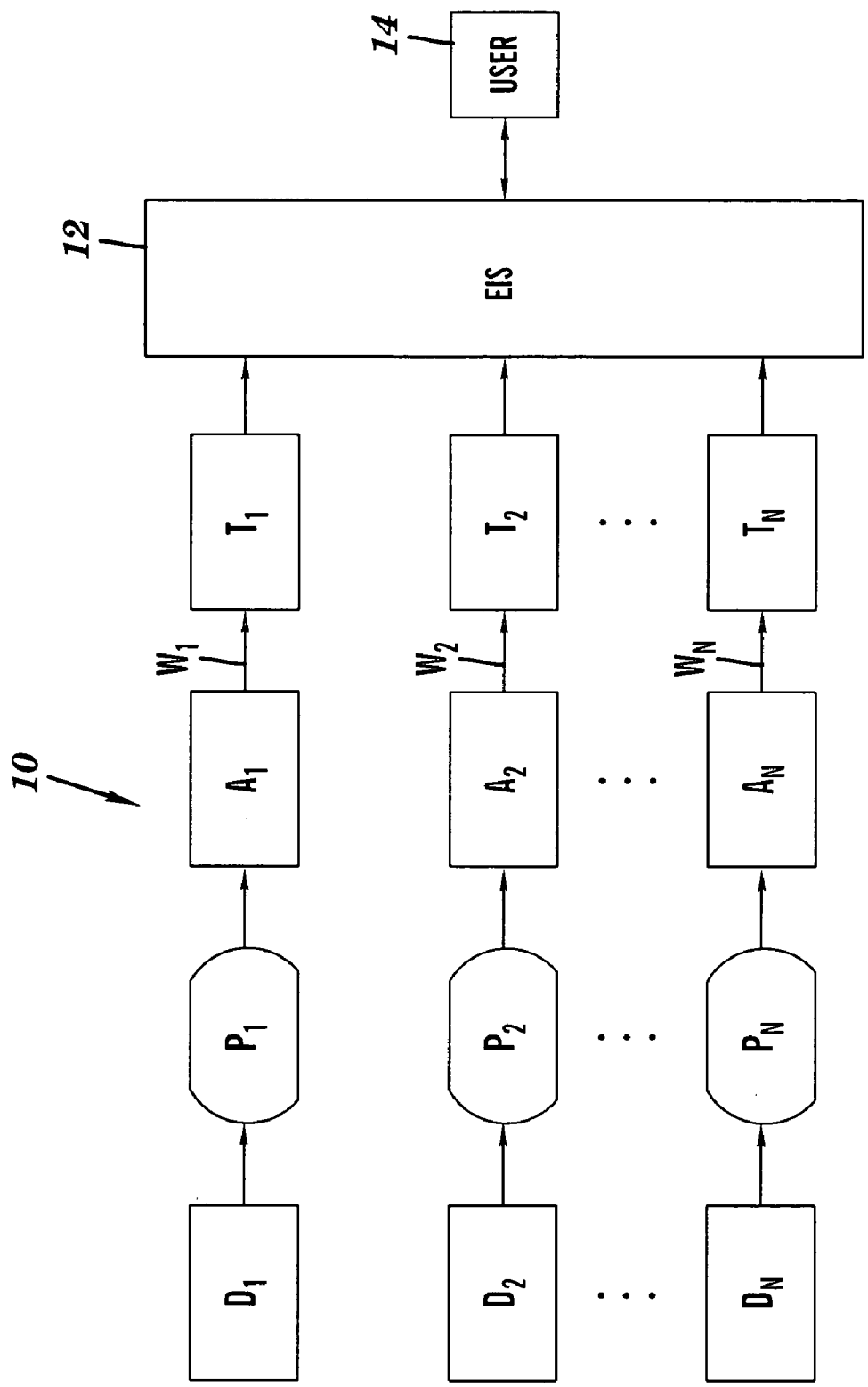
FIG. 1 is a block diagram of a system comprising bridge programs, and associated methodology, for generating a report by the Executive Information System (EIS) of the Systems Applications and Products (SAP) software, in accordance with embodiments of the present invention.

FIG. 1 is a block diagram of a system 10 comprising bridge programs, and associated Methodology, for generating a report by the Executive Information System (EIS) 12 of the Systems Applications and Products (SAP) software, in accordance with embodiments of the present invention. "EIS", as referred to herein, includes not only the specific versions of EIS that are currently operational, but also includes all future versions of EIS as well as any other reporting program or module of SAP that is intended to operate on data stored in a business data warehouse. In the preceding context, EIS may be generally viewed as an embodiment of a SAP "business information system" having reporting capabilities in conjunction with a business data warehouse. The present invention is relevant to any application that uses EIS, including applications involving procurement data, such as purchase order data and invoice data. Other applications may involve, inter alia, financial situations, human resources (e.g., personnel), financial markets (e.g., a stock market or commodity market), individual company stocks and/or bonds, etc.

FIG. 1 shows N datasets denoted as $D_1, D_2, \ldots, D_N$, wherein $N \geq 1$. For each i (i.e., for $i=1,2,\ldots, N$), the dataset $D_i$ is processed by a non-SAP bridge program $P_i$ to generate an Aspect file $A_i$ which is sent over a data communications network $W_i$ into an EIS 12 environment in a form $T_i$. Definitionally, a data communications network comprises communication lines over which data is transmitted from one node to another, and each said node may include, inter alia, a computer, a terminal, a communication control unit, etc. A user 14 may submit a database query to EIS 12 to obtain a report relating to data in any of $T_1, T_2, \ldots, T_N$ individually or to data in any combination of $T_1, T_2, \ldots, T_N$.

A dataset is defined as any two dimensional organization of data, or of any two-dimensional projection of a M-dimensional organization of data wherein M>2. As examples, a dataset may be a table, database, spreadsheet, file, two-dimensional array (such as within a computer code or database), etc. As a table, database, spreadsheet, or array, the two-dimensionally of the dataset is expressed in terms of rows and columns. As a file, the two-dimensionality of the dataset is expressed in terms of records and fields. As used herein, the terms "row" and "record" are assumed to have the same meaning, and the terms "column" and "field" are likewise assumed to have the same meaning. As another example, the dataset may represent two-dimensional projection of the three-dimensional array $Z_{ijk}$ such that the array index k is constant and the array indices i and j vary. The datasets $D_1, D_2, \ldots, D_N$ may independently be a SAP-formatted dataset or a non-SAP-formatted dataset. A SAP-formatted dataset is a dataset that is readable by any program or module of the SAP software. A non-SAP-formatted dataset is a dataset that is not a SAP-formatted dataset. The datasets $D_1, D_2, \ldots, D_N$ have formats $F_1, F_2, \ldots, F_N$, respectively.

The datasets $D_1, D_2, \ldots, D_N$ may be stored in any storage medium (hard disk, optical disk, compact disk, magnetic tape, etc.), have any size with regard to number of bytes, be configured in accordance with any operating system on any computing platform (e.g., AIX operating system, VM operating system on VMS platform, etc.), and be located anywhere in the world or in outer space (e.g., in the United States, Europe, South America, Asia, Africa, on a ship or submarine in the Atlantic or Pacific Ocean, in a spacecraft, on the Moon, on Mars, etc.). The datasets $D_1, D_2, \ldots, D_N$ may have been generated through any degree of automation ranging from manual data entry to automatic generation of datasets using sophisticated software such as SAP software. As an example of manual data entry, the data for the dataset may be entered manually into a file on a floppy disk, then into a file on a workstation, then into a spreadsheet template which may be passed through the bridge program $P_i$ to generate the Aspect file $A_i$ (i=1, 2, ..., N).

Each non-SAP bridge program $P_i$ (i=1, 2, ..., N) is a computer program that is not part of the SAP software and is thus not encumbered by the inefficiencies of SAP modules for processing large amounts of data. The bridge programs $P_1, P_2, \ldots, P_N$ are respectively keyed to the formats $F_1, F_2, \ldots, F_N$ of the datasets $D_1, D_2, \ldots, D_N$ for respectively generating the Aspect files $A_1, A_2, \ldots, A_N$. Alternatively, the bridge programs $P_1, P_2, \ldots, P_N$ may be replace by a single bridge program P having logical paths $L_1, L_2, \ldots, L_N$ respectively keyed to the formats $F_1, F_2, \ldots, F_N$ for respectively generating the Aspect files $A_1, A_2, \ldots, A_N$. The bridge programs $P_1, P_2, \ldots, P_N$ (or the single bridge program P) may be any executable form (e.g., object code, source text that can be executed by an interpreter program, a macro, etc.).

An Aspect file is a file that is readable by, and may be processed by, EIS 12 aside for a possible conversion to resolve an incompatibility between the respective operating systems and platforms in which the Aspect file and EIS 12 are configured. Thus, the Aspect file has the property that EIS 12 would be able to directly read and process the Aspect file if EIS 12 and the Aspect file were functioning on the same computing platform and with the same operating system. As an example, the Aspect files $A_1, A_2, \ldots, A_N$ may be generated by the bridge programs $P_1, P_2, \ldots, P_N$ (or the single bridge program P) using the VM operating system, while EIS 12 may be functioning in an AIX operating system environment, and file conversion of Aspect files may thus be required for operating system compatibility purposes. As another example, such Aspect file conversions may be required even if the Aspect file and EIS 12 both operate in accordance with the same operating system (e.g., AIX, UNIX, etc.). Accordingly, the Aspect files $A_1, A_2, \ldots, A_N$, which are respectively sent over the data communications networks $W_1, W_2, \ldots, W_N$ may be respectively converted into the Temp files $T_1, T_2, \ldots, T_N$ if such conversion is necessary to resolve the operating system incompatibilities discussed supra. Thus, it is to be understood herein that if no such conversions are necessary then $T_i$ and $A_i$ (i=1, 2, ..., N) are the same Aspect file, and if such conversions are necessary then $T_i$ is a converted form of $A_i$ due to operating system and/or platform incompatibilities only. The term "Temp file", as used herein, covers both of the preceding possibilities and is thus viewed as an Aspect file generated by the non-SAP bridge program of the present invention. Accordingly, the Aspect files are viewed herein as logically readable by EIS 12 since the logical structure of the Aspect files (in terms of records and fields, or rows and columns) is adapted to be read by EIS 12.

Without the bridge programs of the present invention, a SAP dataset would normally be processed within SAP by going through SAP Logistic Information System (LIS) modules, then through SAP Open Information Warehouse (OIW) modules, and finally into EIS. The preceding path of LIS→OIW→EIS is extremely time intensive and thus highly inefficient. In contrast, the bridge programs $P_1, P_2, \ldots, P_N$ (or the single bridge program P) of the present invention provide a bridge, or direct shunt from a SAP dataset or a non-SAP dataset into EIS 12 without using LIS or OIW. As will be discussed infra, the bridge program implements filtration and rollup functionality that may drastically reduce the amount of data that is transferred from the datasets $D_1, D_2, \ldots, D_N$ into the Aspect files $A_1, A_2, \ldots, A_N$, respectively. Thus, filtration and rollup by the bridge program significantly reduces the overall processing time for generating a report from EIS.

With filtration, the bridge program uses "selection rules" to identify "select records" of the dataset. A "select record" is a record of the dataset having data to be inserted into the associated Aspect file. When filtration is used, a dataset record that is not a select record does not contribute data to the Aspect file. FIG. 2 illustrates a dataset having 15 records with records 1–2, 5–7, 9, and 13–14 identified by an adjacent asterisk (*) as being select records. The selection rules determine which records of the dataset are select records. A selection rule typically performs logical and/or arithmetic operations on the data in one or more fields of a records and the outcome or result of said logical and/or arithmetic operations determines whether or not the record is a select record. An example of a selection rule is that of "date screening." With date screening, the records of the dataset have a field that includes an effective date (e.g., the date at which a purchase order was placed, wherein the records of the dataset contain information concerning purchase orders). The "date screening" selection rule states that for a given first date $DATE_1$ and second date $DATE_2$, such that $DATE_1$ is earlier than $DATE_2$, a record is identified as a select record if its effective date is not earlier than $DATE_1$ and not later than $DATE_2$. Conversely, the record is not a select record if its effective date is earlier than $DATE_1$ or later than $DATE_2$.

Another example of a selection rule is with records that include invoice data, wherein the selection rule examines the contents of a field to determine whether the invoice associated with the record is a canceled invoice. A selection rule can be very complex and involve multiple fields and/or multiple operations on the fields. Virtually any desired combination of logical and/or arithmetic operations can be used to form a selection rule. Another selection rule could involve testing macroscopic characteristics of a record instead of data in fields of the record (e.g., rejecting records whose length exceed a predetermined number of bytes). The selection rule may be in any programmable form such as executing a logical statement, calling a subroutine or subprogram that performs a test that implements the selection rule, testing data in record fields against a readout of a hardware device as a system clock or an inline measurement instrument (e.g., a voltmeter, a pressure transducer, etc.).

FIGS. 3–5 illustrate how the bridge program performs rollup functionality. FIG. 3 illustrates a dataset table of raw data having 5 columns (or fields) and 22 rows (or records) as indicated. The dataset table of FIG. 3 stores purchase order records of a paint distributor company having three divisions (100, 200, 300) and the company purchases paint for distribution to customers in two paint colors (white and blue). The fields are Purchase Order No., Vendor, Division, Color, and Buyer. Vendor (A, B, or C) denotes from whom the paint was to be purchased, and Buyer denotes the person in the company who made the purchase order. The dataset table of FIG. 3 constitutes the select records of a dataset of raw records if filtration has been performed, or the entire dataset of raw records if filtration has not been performed.

The Division and Color fields collectively constitute a "keygroup" which is used for sorting and rolling up. A keygroup generally comprises one or more fields, and said fields of the keygroup are not required to be contiguously distributed along the record length. Each combination of data of the keygroup of each record of FIG. 3 is called a "keyvalue." Each unique combination of data in the keygroups of the records of FIG. 3 is called a "rollup keyvalue." FIG. 3 shows 6 rollup keyvalues, namely: (100, blue); (100, white); (200, blue); (200, white); (300, blue); (300, white).

The 6 rollup keyvalues are clearly seen after a sort is performed on the table of FIG. 3, using the first keygroup component (Division) as the primary sort key, and the second keygroup component (Color) as the secondary sort key. FIG. 4 shows the result of the aforementioned sort with an organized arrangement of the 6 rollup keyvalues.

FIG. 5 shows the table of FIG. 4 as "rolled up." The operation of rolling up comprises eliminating records of FIG. 4 that have redundant keyvalues, so that the records of the rolled up table of FIG. 5 each have a rollup keyvalue that uniquely identifies each record and thus distinguishes each record from every other record. The rollup table of FIG. 5 has several features. First, each record of FIG. 5 has a unique rollup keyvalue, as discussed supra. Second, the Purchase Order No. field and the Buyer field were eliminated, because these eliminated fields are not needed for subsequent data processing by the EIS 12 of FIG. 1. Third, the Vendor field is retained in FIG. 5, wherein the Vendor value appearing in FIG. 5 is the Vendor value in those records of FIG. 4 that are also present in FIG. 5. Even if the Vendor value is not needed for subsequent data processing by the EIS 12 of FIG. 1, it is nonetheless permissible to retain the Vendor field as is done in the rolled up table of FIG. 5. Accordingly, an absence in FIG. 5 of some of the Vendor values that appears in FIGS. 3 and 4 will not adversely impact subsequent data processing by the EIS 12 of FIG. 1. Alternatively, the Vendor field could have been eliminated from the rolled up table of FIG. 5 as were the Purchase Order No. field and Buyer field. Note that for the records in FIG. 4 having redundant keyvalues, the first-appearing such record for each rollup keyvalue has been retained for placement in FIG. 5. Fourth, an added Quantity field in FIG. 5 stores the number of records in FIG. 4 having the same rollup keyvalue. The records of FIG. 5 are called "rollup records," and the table of FIG. 5 exemplifies the Aspect file having the rollup records. Note that the rollup records in the generated Aspect file of FIG. 5 are sorted with respect to the keygroup (i.e., with respect to keyvalues of the keygroup).

In summary, given a dataset of raw records, generating the Aspect file having rollup records comprises rolling up a "portion" of the dataset of raw records with respect to the keygroup (e.g., the keygroup Division, Color in the preceding example), which 1) eliminates raw records having redundant keyvalues; and 2) includes within each rollup record of the Aspect file a "rollup" field and "quantity" field, wherein the rollup field stores a rollup keyvalue of the keygroup, and wherein the quantity field stores the number of dataset records in FIG. 4 that have the same rollup keyvalue. Note that said "portion" of the dataset of raw records constitutes the select records of the dataset of raw records if filtration has been performed, or the entire dataset of raw records if filtration has not been performed.

The preceding discussion described filtration and rolling up for using a single dataset to generate a single Aspect file. The following discussion describes analogous notation for applying filtration and rolling up to the N datasets $D_1$, $D_2$, ..., $D_N$ ($N \geq 2$) in the generation of the N Aspect files $A_1, A_2, ..., A_N$, respectively, such that the Aspect files $A_1$, $A_2, ..., A_N$ have rollup records $[R]_1, [R]_2, ..., [R]_N$. The datasets $D_1, D_2, ..., D_N$ having a common keygroup. For i=1,2, ..., and N, the non-SAP bridge program is executed to identify select records $[S]_i$ of the dataset $D_i$, in accordance with selection rules applied to $D_i$. The selection rules may be the same for each of the N datasets, or may differ for each of the N datasets. The rollup records $[R]_i$ corresponding to $[S]_i$ have a rollup field and a quantity field. The rollup field stores a rollup keyvalue of the select records $[S]_i$, and the quantity field stores the number of select records of $[S]_i$ that have the same rollup keyvalue.

Returning to FIG. 1, it is recalled that the Aspect files $A_1$, $A_2, ..., A_N$ are transmitted to EIS 12 where the Aspect files are the Temp files $T_1, T_2, ..., T_N$, respectively. The Aspect files and the Temp files are the same structurally (i.e., the same as to records and fields and data therein), as explained supra. Thus, the Aspect files and the Temp files have the same rollup records. The user 14 may make a query, such as to sum over the quantity field for a subset of the rollup records of one or more of the Temp files. The query may be any database query that is intended to access the Temp files. The pertinent subset of the rollup records is determined by the query itself, since the query limits the scope of the data that is required to return a result of the query, as is typical with database queries. The query is executed by a SAP module, namely EIS, in the SAP computing environment. Such execution by EIS returns a result of the query to the user 14.

Filtration and rollup, as implemented by the bridge programs $P_1, P_2, ..., P_N$ (or the bridge program P) may drastically reduce the amount of data that is transferred from the datasets $D_1, D_2, ..., D_N$ into the Aspect files $A_1$, $A_2, ..., A_N$, respectively (see FIG. 1). Thus, only a small percentage of data from the raw datasets may propagate to the Temp files at EIS 12, resulting in substantial reductions in processing time.

The bridge program is further adapted to generate a "trace file" for debugging purposes. For example, if the user 14 in FIG. 1 makes a query to EIS 12 and notices an anomalous result, such as an invoice that is outstanding for 9999 days (i.e., 27 years), then the user 14 would suspect that an error has occurred and would desire to find the source of the error. The rolling Up process, however, may result in eliminating fields (e.g., invoice number, invoice date, etc.) of the raw dataset in the Aspect file, wherein said fields may be required or beneficial for tracing back to the raw dataset where the error may have originated. Fortunately, the trace file of the present invention makes it possible to trace back from the Aspect file to the associated raw dataset. In particular, the trace file includes a representative rollup keyvalue of the keygroup that is stored in the Aspect file and is common to the raw dataset. The trace file also includes a pointer that points to a portion of the raw dataset that is correlated with the representative rollup keyvalue. For example, the pointer may be a representative invoice number or a representative invoice date. Accordingly, the information in the trace file may not point to exactly where in the raw dataset the problematic invoice is, but will nonetheless point to a nearby portion of the raw dataset. Thus, the nearby portion of the raw dataset is effectively correlated with the representative rollup keyvalue through the pointer.

FIG. 6 lists the fields of an exemplary Aspect file that contains blocked invoices, in accordance with embodiments of the present invention. A blocked invoice is an invoice that has been submitted by an entity (e.g., company) for payment by a supplier, but the invoice contains information (relating to price, quantity, taxes, receipt of goods, etc.) that is inconsistent with an associated purchase order previously issued by the entity to the supplier. The blocked invoice may be flagged for manual attention to determine the reason for the inconsistency. In FIG. 6, the "Data Type" includes a specification of the number of characters in the field (e.g., 003, 001, etc.), and the "Source" is a table name or file name identifying where the data for the field is located. The detailed description of the fields listed in FIG. 6 is presented in FIG. 7.

Figure 8:
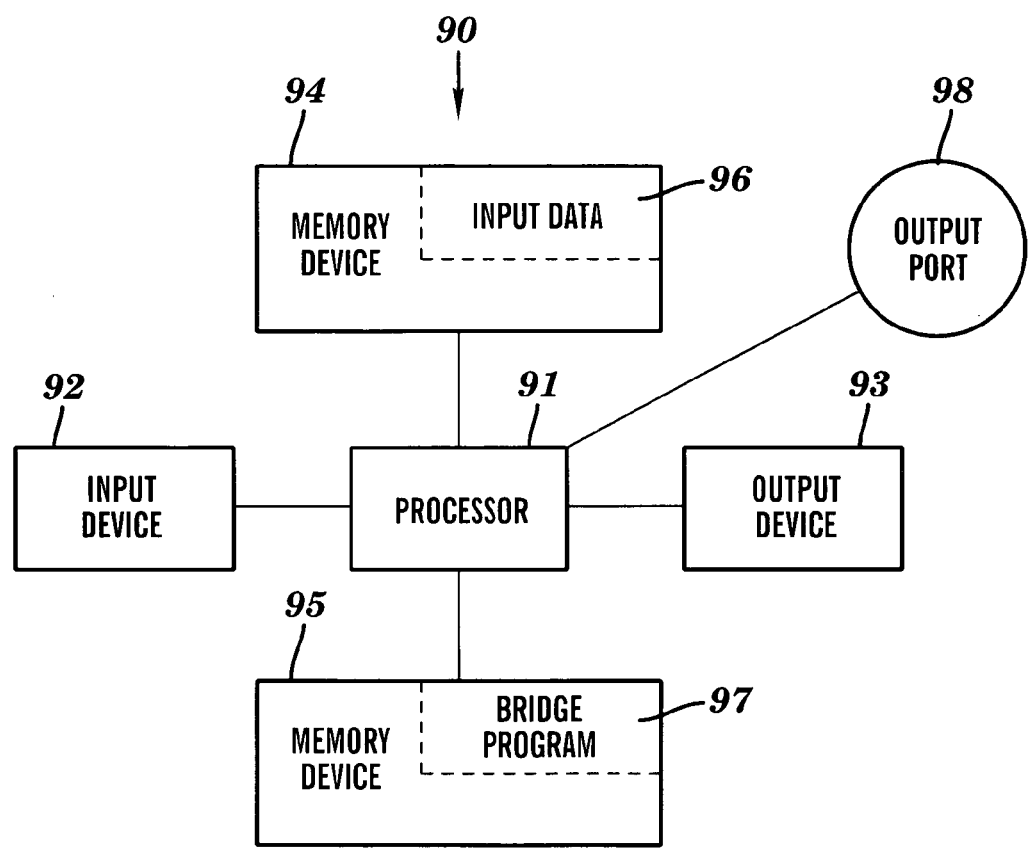
FIG. 8 depicts a computer system that includes a bridge program of FIG. 1, in accordance with embodiments of the present invention.

FIG. 8 illustrates a computer system 90 for storing and executing the bridge program $P_1$, $P_2$, ..., or $P_N$ of FIG. 1, in accordance with embodiments of the present invention. The computer system 90 comprises a processor 91, an input device 92 coupled to the processor 91, an output device 93 coupled to the processor 91, an output port 98 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a dynamic random access memory (DRAM), a read-only memory (ROM), etc. The memory device 95 includes a bridge program 97 for generating Aspect files. The processor 91 executes the bridge program 97. The memory device 94 includes input data 96. The input data 96 includes input (e.g., datasets, control cards or files, etc.) required by the bridge program 97. The output device 93 displays printed output from the bridge program 97. The output port 98 interfaces a data communications network (see $W_1$, $W_2$, ..., or $W_N$ of FIG. 1) for sending the Aspect files to the EIS 12 environment (see FIG. 1).

While FIG. 8 shows the computer system 90 as a particular configuration of hardware and software, any configuration of hardware and software, as would be known to a person of ordinary skill in the art, may be utilized for the purposes stated supra in conjunction with the particular computer system 90 of FIG. 8. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A system comprising a processor and a computer readable memory unit coupled to the processor, said memory unit containing instructions that when executed by the processor implement a method for generating a report by a reporting tool of a business information system using data included within an Aspect file, said method comprising executing a bridge program not comprised by the business information system, said executing including:

generating the Aspect file through use of data derived from a dataset, said generating using a first operating system, said Aspect file not readable by the business information system only because the business information system is functioning within a second operating system that differs from the first operating system;

converting the Aspect file into a Temp file that is readable by the business information system; and transmitting the Temp file to the business information system, wherein the business information system has reporting capabilities in conjunction with a business data warehouse.

2. The system of claim 1, wherein the dataset is dataset formatted such that the dataset is not readable by a program or module of the business information system.

3. The system of claim 1, wherein the dataset is formatted such that the dataset is readable by any program or module of the business information system.

4. A system for generating a report by a reporting tool of a business information system using data included within an Aspect file having rollup records, said system comprising a bridge program not comprised by the business information system, wherein the bridge program is adapted to generate the Aspect file through use of data derived from a dataset and to transmit the Aspect file to the business information system, said dataset having a keygroup, wherein to generate the Aspect file includes to roll up a portion of the dataset with respect to the keygroup, wherein each rollup record has a rollup field and a quantity field, wherein the rollup field stores a rollup keyvalue of the keygroup, wherein the quantity field stores the number of dataset records that have the same rollup keyvalue, wherein each rollup record has a unique rollup keyvalue, and wherein the business information system has reporting capabilities in conjunction with a business data warehouse.

5. The system of claim 4, wherein the bridge program is further adapted to cause the rollup records in the generated Aspect file to be sorted with respect to the keygroup.

6. The system of claim 4, wherein the dataset is formatted such that the dataset is not readable by a program or module of the business information system.

7. The system of claim 4, wherein the dataset is formatted such that the dataset is readable by any program or module of the business information system.

8. The system of claim 4, wherein the bridge program is further adapted to generate a trace file that includes a representative rollup keyvalue of the keygroup and a pointer that points to a portion of the dataset, said portion being correlated with the representative rollup keyvalue.

9. The system of claim 4, wherein the bridge program is further adapted to identify select records of the dataset in accordance with at least one selection rule applied to the dataset, and wherein the portion of the dataset includes the select records so identified.

10. The system of claim 9, wherein to identify the select records includes to accept as input a first date and a second date, wherein the first date is earlier than the second date, and wherein the selection rules do not permit identifying as a select record any record of the dataset having an effective date that is earlier than the first date or later than the second date.

11. The system of claim 4, wherein the dataset is selected from the group consisting of a table, a spreadsheet, and a combination thereof.

12. The system of claim 4, wherein the report relates to procurement data, and wherein the rollup records include the procurement data.

13. The system of claim 12, wherein the procurement data is selected from the group consisting of purchase order data, invoice data, and a combination thereof.

14. A system for generating a report by a reporting tool of a business information system using and combining data included within N Aspect files $A_1, A_2, \ldots, A_N$ respectively having rollup records $[R]_1, [R]_2, \ldots, [R]_N$, said N at least 2, said system comprising at least one bridge program not comprised by the business information system, wherein the bridge program is adapted to respectively generate the N Aspect files through use of data derived from select records $[S]_1, [S]_2, \ldots, [S]_N$ of N datasets $D_1, D_2, \ldots D_N$, respectively, and to transmit the N Aspect files to the business information system, said select records $[S]_1, [S]_2, \ldots, [S]_N$ having a common keygroup, wherein to generate the N Aspect files comprises, for I=1, 2, ..., and N;
- to identify the select records $[S]_i$ in accordance with selection rules applied to $D_i$; and
- to roll up the select records $[S]_i$ with respect to the common keygroup, wherein the rollup records $[R]_i$ corresponding to $[S]_i$ have a rollup field and a quantity field, wherein the rollup field stores a rollup keyvalue of the select records $[S]_i$, wherein the quantity field stores the number of select records of $[S]_i$ that have the same rollup keyvalue, wherein each rollup record $[R]_i$ has a unique rollup keyvalue, and wherein the business information system has reporting capabilities in conjunction with a business data warehouse.

15. The system of claim 14, wherein a first dataset of the N datasets is formatted such that the dataset is not readable by a program or module of the business information system.

16. The system of claim 14, wherein a first dataset of the N datasets is formatted such that the dataset is readable by any program or module of the business information system.

17. The system of claim 14, wherein a first dataset of the N datasets and a second dataset of the N datasets have different formats.

18. The system of claim 14, wherein the datasets $D_1, D_2, \ldots, D_N$ have formats $F_1, F_2, \ldots, F_N$, respectively, wherein the at least one bridge program comprises N bridge programs $P_1, P_2, \ldots, P_N$ respectively keyed to the formats $F_1, F_2, \ldots, F_N$ for respectively generating the Aspect files $A_1, A_2, \ldots, A_N$.

19. The system of claim 14, wherein the datasets $D_1, D_2, \ldots, D_N$ have formats $F_1, F_2, \ldots, F_N$, respectively, and wherein the at least one bridge program consists of one bridge program having logical paths $L_1, L_2, \ldots, L_N$ respectively keyed to the formats $F_1, F_2, \ldots, F_N$ for respectively generating the Aspect files $A_1, A_2, \ldots, A_N$.

20. The system of claim 14, wherein the selection rules are the same for each of the N datasets.

21. The system of claim 14, wherein the report relates to procurement data, and wherein the rollup records $[R]_1, [R]_2, \ldots, [R]_N$ include the procurement data.

22. The system of claim 21, wherein the procurement data is selected from the group consisting of purchase order data, invoice data, and a combination thereof.

23. A method for generating a report by a reporting tool of a business information system using data included within an Aspect file, said method comprising executing a bridge program not comprised by the business information system, said executing including:
- generating the Aspect file through use of data derived from a dataset, said generating using a first operating system, said Aspect file not readable by the business information system only because the business information system is functioning within a second operating system that differs from the first operating system;
- converting the Aspect file into a Temp file that is readable by the business information system; and
- transmitting the Temp file to the business information system, wherein the business information system has reporting capabilities in conjunction with a business data warehouse.

24. The method of claim 23, wherein the dataset is formatted such that the dataset is not readable by a program or module of the business information system.

25. The method of claim 23, wherein the dataset is formatted such that die dataset is readable by any program or module of the business information system.

26. A method for generating a report by a reporting tool of a business information system using data included within an Aspect file having roll up records, said method comprising:
- providing a dataset having a keygroup; and
- executing a bridge program not comprised by the business information system, including generating the Aspect file, said generating comprising rolling up a portion of the dataset with respect to the keygroup, wherein each rollup record has a rollup field and a quantity field, wherein the rollup field stores a rollup keyvalue of the keygroup, wherein the quantity field stores the number of dataset records that have the same rollup keyvalue, wherein each rollup record has a unique rollup keyvalue, and
- wherein the business information system has reporting capabilities in conjunction with a business data warehouse.

27. The method of claim 26, wherein generating the Aspect file includes causing the rollup records in the generated Aspect file to be sorted with respect to the keygroup.

28. The method of claim 26, wherein the dataset is formatted such that the dataset is not readable by a program or module of the business information system.

29. The method of claim 26, wherein the dataset is formatted such that the dataset is readable by any program or module of the business information system.

30. The method of claim 26, further comprising generating a trace file that includes a representative rollup keyvalue of the keygroup and a pointer that points to a portion of the dataset, said portion being correlated with the representative rollup keyvalue.

31. The method of claim 26, further comprising identifying select records of the dataset in accordance with at least one selection rule applied to the dataset, said portion of the dataset including the select records so identified.

32. The method of claim 31, said identifying including accepting as input a first date and a second date, said first date earlier than said second date, said selection rules not permitting said identifying to identity as a select record any record of the dataset having an effective date that is earlier than the first date or later than the second date.

33. The method of claim 26, wherein the dataset is selected from the group consisting of a table, a spreadsheet, and a combination thereof.

34. The method of claim 26, wherein the report relates to procurement data, and wherein the rollup records include the procurement data.

35. The method of claim 34, wherein the procurement data is selected from the group consisting of purchase order data, invoice data, and a combination thereof.

36. The method of claim 26, further comprising:
transmitting the Aspect file to the business information system where the Aspect file becomes a Temp file having the rollup records;
making a query to sum over the quantity field for a subset of the rollup records of the Temp file, wherein the subset is determined by the query, and wherein the query is adapted to being executed by a module of the business information system; and
executing the query by the module including returning a result of the query.

37. A method for generating a report by a reporting tool of a business information system using and combining data included within N Aspect files $A_1, A_2, \ldots, A_N$ respectively having rollup records $[R]_1, [R]_2, \ldots, [R]_N$, said N at least 2, said method comprising providing N datasets $D_1, D_2, \ldots, D_N$ having a common keygroup, and for I=1, 2, ..., and N executing a bridge program not comprised by the business information system, including:
identifying select records $[S]_i$ of the dataset $D_i$, said identifying in accordance with selection rules applied to $D_i$; and
rolling up the select records $[S]_i$ with respect to the common keygroup, wherein the rollup records $[R]_i$ corresponding to $[S]_i$ have a rollup field and a quantity field, wherein the rollup field stores a rollup keyvalue of the select records $[S]_i$, wherein the quantity field stores the number of select records of $[S]_i$ that have the same rollup keyvalue, wherein each rollup record $[R]_i$ has a unique rollup keyvalue, and wherein the business information system has reporting capabilities in conjunction with a business data warehouse.

38. The method of claim 37, wherein a first dataset of the N datasets is formatted such that the dataset is not readable by a program or module of the business information system.

39. The method of claim 37, wherein a first dataset of the N datasets is formatted such that the dataset is readable by any program or module of the business information system.

40. The method of claim 37, wherein a first dataset of the N datasets and a second dataset of the N datasets have different formats.

41. The method of claim 37, wherein the datasets $D_1, D_2, \ldots, D_N$ have formats $F_1, F_2, \ldots, F_N$ respectively, wherein the at least one bridge program comprises N bridge programs $P_1, P_2, \ldots, P_N$ respectively keyed to the formats $F_1, F_2, \ldots, F_N$ for respectively generating the Aspect files $A_1, A_2, \ldots, A_N$.

42. The method of claim 37, wherein the datasets $D_1, D_2, \ldots, D_N$ have formats $F_1, F_2, \ldots, F_N$ respectively, and wherein the at least one bridge program consists of one bridge program having logical paths $L_1, L_2, \ldots, L_N$ respectively keyed to the formats $F_1, F_2, \ldots, F_N$ for respectively generating the Aspect files $A_1, A_2, \ldots, A_N$.

43. The method of claim 37, wherein the selection rules are the same for each of the N datasets.

44. The method of claim 37, wherein the report relates to procurement data, and wherein the rollup records $[R]_1, [R]_2, \ldots, [R]_N$ include the procurement data.

45. The method of claim 44, wherein the procurement data is selected from the group consisting of purchase order data, invoice data, and a combination thereof.

46. The method of claim 37, further comprising:
transmitting the Aspect file $A_1$ to the business information system where the Aspect file $A_1$ becomes a Temp file $T_i$ having flue rollup records $[R]_i$ for I=1, 2, ..., and N;
making a query to sum over the quantity field for a subset of the rollup records of the N Temp files in composite, wherein the subset is determined by the query, and wherein the query is adapted to being executed by a module of the business information system; and executing the query by the module including returning a result of the query.

47. A computer program product, comprising a computer usable medium having a computer readable program code embodied therein, said computer readable program code comprising an algorithm adapted to implement a method for generating a report by a reporting tool of a business information system using data included within an Aspect file, said method comprising executing a bridge program not comprised by the business information system, said executing including:
generating the Aspect file through use of data derived from a dataset, said generating using a first operating system, said Aspect file not readable by the business information system only because the business information system is functioning within a second operating system that differs from the first operating system;
converting the Aspect file into a Temp file that is readable by the business information system; and
transmitting the Temp file to the business information system, wherein the business information system has reporting capabilities in conjunction with a business data warehouse.

48. A computer program product, comprising a computer usable medium having a computer readable program code embodied therein for generating a report by a reporting tool of a business information system using data included within an Aspect file having rollup records, said program code comprising a bridge program not comprised by the business in formation system, wherein the bridge program is adapted to generate the Aspect file through use of data derived from a dataset and to transmit the Aspect file to the business information system, said dataset having a keygroup, wherein to generate the Aspect file includes to roll up a portion of the dataset with respect to the keygroup, wherein each rollup record has a rollup field and a quantity field, wherein the rollup field stores a rollup keyvalue of the keygroup, wherein the quantity field stores the number of dataset records that have the same rollup keyvalue, wherein each rollup record has a unique rollup keyvalue, and wherein the business information system has reporting capabilities in conjunction with a business data warehouse.

49. A computer program product, comprising a computer usable medium having a computer readable program code embodied therein for generating a report by a reporting tool of a business information system using and combining data included within N Aspect files $A_1, A_2, \ldots, A_N$ respectively having rollup records $[R]_1, [R]_2, \ldots, [R]_N$, said N at least 2, said program code comprising at least one bridge program not comprised by the business information system, wherein the bridge program is adapted to respectively generate the N Aspect files through use of data derived from select records $[S]_1, [S]_2, \ldots, [S]_N$ of N datasets $D_1, D_2, \ldots, D_N$, respectively, and to transmit the N Aspect files to the business information system, said select records $[S]_1, [S]_2, \ldots, [S]_N$ having a common keygroup, wherein to generate the N Aspect files comprises, for I=1, 2, . . . , and N:

to identify the select records $[S]_i$ in accordance with selection rules applied to $D_i$; and to roll up the select records $[S]_i$ with respect to the common keygroup, wherein the rollup records $[R]_i$ corresponding to $[S]_i$ have a rollup field and a quantity field, wherein the rollup field stores a rollup keyvalue of the select records $[S]_i$, wherein the quantity field stores the number of select records of $[S]_i$ that have the same rollup keyvalue, wherein each rollup record $[R]_i$ has a unique rollup keyvalue, and wherein the business information system has reporting capabilities in conjunction with a business data warehouse.

* * * * *

UNITED STATES PATENT AND TRADEMARK OFFICE
CERTIFICATE OF CORRECTION

PATENT NO. : 7,076,492 B2 Page 1 of 1
APPLICATION NO. : 09/893990
DATED : July 11, 2006
INVENTOR(S) : Campbell et al.

It is certified that error appears in the above-identified patent and that said Letters Patent is hereby corrected as shown below:

Drawing Sheet 6
Line 10, delete "_DYSR" and insert --_DYSRF --
Line 12, delete "indicato" and insert -- indicator --
Line 12, delete "ASA" and insert -- ASAP --
Line 20, delete "Referenc" and insert -- Reference --
Line 21, delete "_SUPS" and insert -- SUPSG --
Line 25, delete "_UNI" and insert -- UNIT --

Column 2
Line 61, delete "$\geqq$" and insert --$\geq$ --

Column 8
Line 36, delete the second "dataset" and insert -- delete --

Column 10
Line 42, delete "roll up" and insert -- rollup --

Column 12
Line 24, delete "flue" and insert -- the --

Signed and Sealed this

Sixteenth Day of October, 2007

JON W. DUDAS
*Director of the United States Patent and Trademark Office*